US012747940B2

(12) United States Patent
Cavanaugh et al.

(10) Patent No.: US 12,747,940 B2
(45) Date of Patent: Sep. 29, 2026

(54) SYSTEM AND METHOD FOR DETECTING SUBGRADE DEFORMATION

(71) Applicant: Tensar International Corporation, Alpharetta, GA (US)

(72) Inventors: Joseph Cavanaugh, Alpharetta, GA (US); John Wallace, Alpharetta, GA (US); Matthew Hammond, Alpharetta, GA (US); Tom Ross Jenkins, Alpharetta, GA (US)

(73) Assignee: Tensar International Corporation, Alpharetta, GA (US)

( * ) Notice: Subject to any disclaimer, the term of this patent is extended or adjusted under 35 U.S.C. 154(b) by 292 days.

(21) Appl. No.: 18/293,568

(22) PCT Filed: Aug. 1, 2022

(86) PCT No.: PCT/US2022/039027
§ 371 (c)(1),
(2) Date: Jan. 30, 2024

(87) PCT Pub. No.: WO2023/009889
PCT Pub. Date: Feb. 2, 2023

(65) Prior Publication Data

US 2025/0102284 A1 Mar. 27, 2025

Related U.S. Application Data

(60) Provisional application No. 63/227,626, filed on Jul. 30, 2021.

(51) Int. Cl.
*G01B 5/30* (2006.01)
*G01B 7/16* (2006.01)

(52) U.S. Cl.
CPC .................................... *G01B 5/30* (2013.01); *G01B 7/18* (2013.01)

(58) Field of Classification Search
CPC . G01B 5/30; G01B 7/18; G01B 21/32; G01B 11/18; E01C 23/01; G01C 15/00
See application file for complete search history.

(56) References Cited

U.S. PATENT DOCUMENTS 12,455,156 B2 * 10/2025 Cavanaugh .............. G01B 7/18
2020/0171893 A1 * 6/2020 Salt ..................... B60C 23/0488
2024/0344289 A1 * 10/2024 Wallace .................. E01C 23/01

FOREIGN PATENT DOCUMENTS

CN 109459094 A 3/2019
CN 209128856 U 7/2019
(Continued)

OTHER PUBLICATIONS

Imjai Thanongsak et al: "Performance of geosynthetic-reinforced flexible pavements in full-scale field trials", Geotextiles and Geomembranes, vol. 47, No. 2, Jan. 11, 2019 (Jan. 11, 2019), pp. 217-229.

(Continued)

*Primary Examiner* — David Z Huang
(74) *Attorney, Agent, or Firm* — E. Eric Mills; Bryan L. Baysinger; Maynard Nexsen PC

(57) ABSTRACT

Disclosed are various embodiments for a sensor enabled geogrid for the monitoring and detection of subgrade deformation in infrastructure such as roadways, railways, working platforms, and marine applications. The system and methods contain a sensor enabled geogrid, inertial measurement units (IMUs), one or more sensors, a data collection apparatus such as a sensor pod, an information transmission apparatus such as a gateway device, a communications network, and a computing device capable of performing analytics on information from the IMU's and other sensors.

(Continued)

The disclosure further includes methods of processing information received from a sensor enabled geogrid by a sensor pod. In the example, the sensor pod transmits received information to a gateway device for transmitting to a backend computing system. The backend computing system then performs an analysis on the information to determine variance from an initial sensor position, and alerts of possible infrastructure failure.

18 Claims, 12 Drawing Sheets

(56) References Cited

FOREIGN PATENT DOCUMENTS

| | | |
|---|---|---|
| CN | 212340314 U | 1/2021 |
| CN | 213296312 U | 5/2021 |

OTHER PUBLICATIONS

International Search Report and Written Opinion issued in counterpart PCT Application No. PCT/US2022/039027 dated Oct. 27, 2022 (seven (7) pages).

* cited by examiner

SYSTEM AND METHOD FOR DETECTING SUBGRADE DEFORMATION

CROSS-REFERENCE TO RELATED APPLICATIONS

This application is a 35 U.S.C. § 371 U.S. national phase entry of International Application No. PCT/US2022/039027 having an international filing date of Aug. 1, 2022, which is related and claims priority to U.S. Provisional Patent Application No. 63/227,626 entitled "System and Method for Detecting Subgrade Deformation" filed Jul. 30, 2021. This application is also related to and co-filed with utility application "Systems and Methods for Sensor Enabled Monitoring of Working Platforms", which claims priority to U.S. Provisional No. 63/227,614, entitled "Systems and Methods for Sensor Enabled Monitoring of Working Platforms" filed Jul. 30, 2021. The entire disclosure of said applications are incorporated herein by reference in their entirety.

FIELD

The present disclosure relates generally to structural health monitoring, more particularly to a sensor-enabled geogrid and/or a computing platform for detecting subgrade deformation utilizing sensors configured to computing hardware and software.

BACKGROUND

Roadways, transportation corridors (e.g. rail and marine), and thoroughfares are an important and critical infrastructure for society, including areas of commercial, military, and recreational use. Roadways can be either paved or unpaved, with pavement types such as asphalt and concrete. Generally, in the construction of roadways, an aggregate base and/or subbase layer is placed over subgrade, which is typically comprised of soil, to provide a supporting structure, and to decrease deformation of the subgrade. Subgrade deformation may occur from various physical sources, and may occur naturally over time. Vehicle trafficking is one such source of subgrade deformation, and vehicle trafficking may be exacerbated by higher weight vehicles and increase in transit speed. Another source is geological features, and or geological unrest, which may be attributed to weather phenomenon, anthropomorphic effects, and/or geotechnical movements. The aggregate base and/or subbase layer provides support and decreases the deformation of the subgrade to counteract subgrade deformation. Unpaved roads utilize a similar approach as paved roads, by placing a layer of aggregate to control subgrade deformation.

There are a number of inputs used when designing a roadway. These inputs include, but are not limited to. 1) type of traffic expected (e.g. heavy trucks, light passenger cars): 2) expected life of the roadway: 3) geotechnical conditions of the subgrade: 4) location, climate, and weather. These inputs determine the various aspects of the design, including the amount of required compaction and thickness of the various layers of aggregate (base/subbase) and the thickness of asphalt/concrete (in paved road construction).

When a load (e.g. a wheel, tire, etc.) passes over a section of the road, the force of the load will be transferred to the road, which in turn transfers the force to the aggregate base and/or subbase layer, such as soil. The result of repeated force on a road is stress, that may often lead to deformation in the road itself, or to the underlying layers such as the base/subbase. A well-designed road has the ability to absorb stress by the multiple layers in an elastic manner. That is, a well-designed road is capable of receiving repetitive force and not deforming. However, if traffic loads exceed the anticipated design parameters, or if other geological or geotechnical conditions exist (e.g. storm, increased erosion, etc.), or if the construction process is flawed, a permanent (inelastic) deformation can result in the road or in the layers. Such inelastic deformation can result in damage to supporting structures causing even further damage to vehicles or objects that traverse the damaged road.

Inelastic deformation is an expensive repair, and one that can be off-set by proper structural monitoring of the layers beneath a road. For these reasons, and others not stated herein, road maintenance is an important consideration for most civil engineers. Several standards have been developed that attempt to quantify the relative "roughness" of a road, with one such standard being the International Roughness Index (IRI), and another being the Pavement Condition Index (PCI). To obtain the IRI or the PCI a subjective assessment is made, typically through visual means and/or measurement equipment (e.g. ground penetrating radar), to ascertain the quality of the road. The risk with subjective assessments is the inherent variability along with human error. Another risk of current IRI or PCI assessments is they rely primarily on surface analysis, disregarding underlying defects that have not presented on the surface of the roadway. For below ground detection, the use of ground penetrating radar is employed, however, it is often costly, time adverse, and requires specialized skills to implement, including a generalized knowledge of where the issue is presenting.

A majority of damage to roadway surfaces can be attributable to some form of deformation. Wherein at least most of the issues arise within the base/subbase or subgrade of the roadway. Such conditions are more difficult to detect and thus more difficult to perform maintenance on. As deformation continues, if left untreated, the damage to a roadway may grow to the point in which a major reconditioning project is required to bring the roadway into compliance and render it usable once more.

Early detection is positioned to prevent large scale reconditioning projects, and through predictive maintenance, could lower the overall cost by reducing repair time and increasing the usable lifetime of roadways. Further, there are extrinsic benefits, such as lower vehicle maintenance (e.g. tires, shocks, struts), better vehicle fuel economy, and safer roadway conditions. This disclosure presents system and methods which provide monitoring and metrics that can be utilized for various activities, including predictive maintenance, understanding vehicle loading, analysis of roadway design assumptions, roadway design lifetime, and prevention of catastrophic failures of roadways. Further, the disclosure herein addresses detecting and quantifying the condition of the subgrade layer of a transportation corridor, and identifying when permanent (inelastic) deformation has or is occurring.

SUMMARY

Systems and methods for utilizing computing components to monitor and detect deformation in a subgrade is disclosed herein. In some aspects, the techniques described herein relate to a system for monitoring and detecting deformation in a subgrade of infrastructure, including: a sensor enabled geogrid, including: a geogrid; and one or more sensors operatively configured to the geogrid, wherein the one or more sensors is configured to detect change from an initial position: a sensor pod, wherein the sensor pod is in electrical communication to the sensor enabled geogrid: a gateway device, wherein the gateway device is in electrical communication to the sensor pod: a backend system, including: a computing device: a display; and a software program for interpreting information from the one or more sensors that is configured to non-transitory memory of the computing device.

In some aspects, the techniques described herein relate to a system, wherein the one or more sensors includes at least an inertial measurement unit ("IMU").

In some aspects, the techniques described herein relate to a system, wherein the IMU is an accelerometer or a gyroscope.

In some aspects, the techniques described herein relate to a system, wherein the one or more sensors is a flex sensor configured to a member of the sensor enabled geogrid so that flex is detected from forces on the sensor enabled geogrid.

In some aspects, the techniques described herein relate to a system, wherein the one or more sensors is a strain gauge configured to a member of the sensor enabled geogrid so that strain is detected from forces on the sensor enabled geogrid.

In some aspects, the techniques described herein relate to a system, wherein the gateway device is in electrical communication to a plurality of sensor pods, and wherein the gateway device sends and receives the information from the plurality of sensor pods.

In some aspects, the techniques described herein relate to a system, further including a mobile computing device, wherein the mobile computing device is configured to access the backend system and can view a user interface to the software program.

In some aspects, the techniques described herein relate to a method for monitoring and detecting deformation in a subgrade, including: providing a sensor enabled geogrid, wherein the sensor enabled geogrid has one or more IMUs operatively configured to the sensor enabled geogrid that are capable of determining tilt: providing a sensor pod, wherein the sensor pod is in electrical communication with the one or more IMUs: providing, a gateway device, wherein the gateway device is in communication with the sensor pod; installing the sensor enabled geogrid and the sensor pod near a subgrade of infrastructure: receiving, by the sensor pod an initial position for the one or more IMUs: monitoring, by a backend computing system, the one or more IMUs, for variance from the initial position: detecting, by the backend computing system, variance from the initial position in the one or more IMUs; and alerting, by the backend computing system, the detected variance in the one or more IMUs.

In some aspects, the techniques described herein relate to a method, wherein detecting the variance from the initial position in the one or more IMUs or other sensors, detects deformation within the subgrade of the infrastructure due to a change in axis tilt of the one or more IMUs.

In some aspects, the techniques described herein relate to a method, further including, providing a sensor enabled geogrid configured with at least one of the following sensors: a flex sensor, a strain gauge, a moisture sensor, a temperature sensor.

In some aspects, the techniques described herein relate to a method, further including, receiving, by the gateway device, signals from at least one of the following sensors: a flex sensor, a strain gauge, a moisture sensor, or a temperature sensor.

In some aspects, the techniques described herein relate to a method, further including providing remedial repair at a location where the variance was detected by the one or more IMUs in the subgrade.

In some aspects, the techniques described herein relate to a method, wherein alerting transmits a visual or audible signal to traffic on a roadway of potential failure.

In some aspects, the techniques described herein relate to a method, wherein alerting transmits a message or communication to a roadway maintenance unit regarding the detected variance by the one or more IMUs in the subgrade.

In some aspects, the techniques described herein relate to a method, further including transmitting, by the sensor pod, across a network, the initial position of the one or more IMUs.

In some aspects, the techniques described herein relate to a method, wherein providing the sensor enabled geogrid further provides one or more sensors on a top and a bottom portion of the sensor enabled geogrid.

In some aspects, the techniques described herein relate to a method, wherein providing the sensor enabled geogrid, further provides a strain gauge operatively configured to an elongated member of the sensor enabled geogrid.

In some aspects, the techniques described herein relate to a method, wherein providing the sensor enabled geogrid, further provides a flex sensor operatively configured to an elongated member of the sensor enabled geogrid.

In some aspects, the techniques described herein relate to a method, further including executing an infrastructure processing engine on the backend computing systems, wherein the infrastructure processing engine processes an algorithm to calculate a degree of tilt of the one or more IMUs.

In some aspects, the techniques described herein relate to a system for monitoring and detecting deformation in subgrade of infrastructure, including: a sensor enabled geogrid, including: a geogrid; and one or more sensors equipped to the geogrid, wherein the one or more sensors is configured to detect change from an initial position: a sensor pod, wherein the sensor pod is in electrical communication to the sensor enabled geogrid and is equipped to receive information from the one or more sensors; a gateway device, wherein the gateway device is in electrical communication to the sensor pod and is equipped to transmit the information from the one or more sensors; and a backend computing device equipped with a software program on non-transitory memory, the software program is equipped for interpreting information received from the one or more sensors, wherein the software program identifies a variance from the initial position and provides an alert.

BRIEF DESCRIPTION OF DRAWINGS

Many aspects of the present disclosure will be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. It should be recognized that these implementations and embodiments are merely illustrative of the principles of the present disclosure. Therefore, in the drawings.

DESCRIPTION

Figure 1:
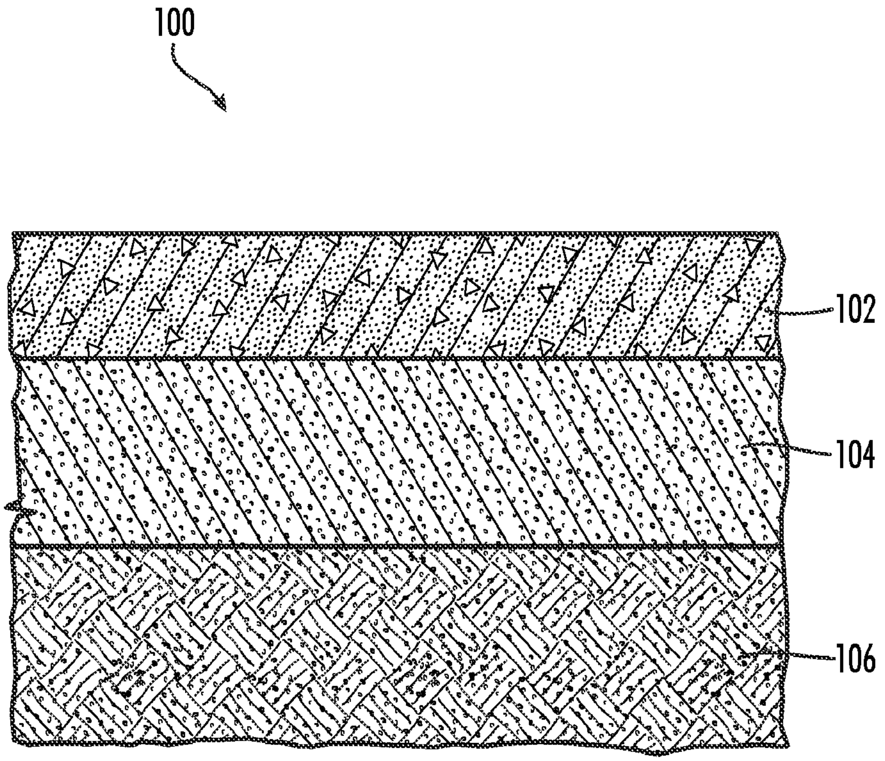
FIG. 1 is an illustration of an example roadway construction.

The present disclosed subject matter will now be described more fully hereinafter with reference to the accompanying drawings, in which some, but not all embodiments of the disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter, as set forth herein, will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Aspects of sensor enabled systems and methods for monitoring and detecting changes in the structural health, integrity, and condition of the base/subbase and/or sublayers of roadways are disclosed. Sensing technologies that provide data to evaluate the condition or health of infrastructure are in common usage in applications such as bridges, tunnels, and buildings. These applications are commonly referred to as Structural Health Monitoring (SHM). Other infrastructure, such as roads, parking lots, working platforms, buildings, walls and slopes, and marine applications, could also benefit from utilizing sensors that provide data that can be used to evaluate their health, condition, or status. However, adding sensors to these applications has traditionally been difficult. Difficulties arise due to the need to remove existing materials as well as to ensure accurate placement of the sensors to provide meaningful data. These problems are further exacerbated by the location and scale of installed infrastructure, roadways in particular can cover large distances and in often difficult environments to survey and monitor by traditional means.

Accordingly, transportation corridor applications (e.g. roadway, rail, marine, etc.) could benefit from SHM if accurate sensor data were available that could be utilized to assess the conditions affecting the subgrade. For example, in roads and pavement applications, overweight or increased traffic loads, erosion, washouts, rutting, or other movements in the pavement can occur under the geogrid and aggregate, causing cracks to appear in the surface of the road and eventually (in extreme conditions) a collapse of the roadway.

Currently, the health and/or condition and status of roadways is typically assessed by visual inspection. Visual inspection lacks the ability to see problems that may lie underground, and or the ability to source the root cause of subgrade failure. Additionally, visual inspections are time consuming, require personnel to be on site to perform the inspection, and suffer from subjectivity in terms of the judgement of the severity of the condition. In many cases, once a problem has been discovered by a visual inspection, the damage has already occurred to the substructure (the soil, aggregate, ballast, sub-ballast, subgrade, etc.) and major repair work may be required (often times in an emergency manner and at an increased cost). There is a long sought need to improve conditions around infrastructure maintenance, health, and condition through systematic monitoring. The disclosure herein attempts to remove human error and remove the labor intensive task of visual inspection. The disclosure seeks to provide teams and organizations with meaningful feedback and understanding of infrastructure health and condition. In doing so, the system and methods herein provide a proactive maintenance program, replacing often reactive measures.

Subgrade deformation (e.g. rutting) typically occurs on a roadway when repeated traffic creates forces on the aggregate that is then transmitted, in a non-elastic fashion to the subgrade. Various products such as geogrids and geofabrics are intended to minimize the transfer of energy to the subgrade. However, over time such conditions are inevitable, and may only be worsened by increased traffic weight and or geologic conditions. The disclosure herein teaches a method to detect changes in the subgrade, including deformation, and to translate the detected parameters into actionable information that can be utilized to 1) predict when maintenance activities should occur to optimize infrastructure life and minimize operational costs: 2) understand if the actual loads match the design assumptions: 3) predict remaining life of the roadway; 4) understand and compare different design techniques: 5) detect and predict catastrophe failure; 6) calculate asset value and incorporate into financial transactions; and 7) understand what products or services would best apply to local conditions.

Furthermore, such systems and methods disclosed herein may be applicable to transportation activities other than roadways, such as railways, rail infrastructure, marine infrastructure, buildings and other infrastructure that contains an aggregate layer and a subgrade, and wherein the subgrade may deform under trafficking on other conditions such as erosion or other geotechnical phenomena (waves, wind, water, etc.), including the passage of time. In such embodiments, the systems and methods herein are placed within similar layers based on design parameters, wherein the sensor enabled geogrid is adapted to or configured so that subgrade deformation may be monitored, detected, and alerted to.

Turning to FIG. 1, an example of roadway construction. In other embodiments, the layers may be quite similar, for instance, railway construction may consist of a base/subbase and a subgrade, along with an aggregate or ballast and rail ties, the principles herein remain the same. In this example the roadway 100 is constructed of a pavement layer 102, the pavement layer 102 is the layer that is directly impacted by traffic. The pavement layer 102 is often referred to as the surface course, or the bearing surface. The pavement layer 102 may be asphalt or Portland cement, or in other cases a blend of binder and asphalt. The pavement layer 102 is typically very strong and durable, with an impermeable barrier or a weather resistant barrier. The next layer is the base/subbase layer 104, wherein the base layer 104 is often defined as a strong layer of free-draining aggregate. The subbase layer 104 is typically defined as a moderate strength layer, free-draining, and often comprised of inexpensive natural material. The subgrade layer 106 defines the bottom layer, it is typically constructed of the natural soils within the area of construction or implementation, it is moisture sensitive, and considered relatively weak. The subgrade layer 106 is typically graded and compacted, if the subgrade layer 106 is of very poor quality for construction, then additives such as cement, lime, or other soils may be added to improve the quality.

In the example of FIG. 1, the roadway 100 is showing no signs of deformation and depicts a roadway 100 in an elastic state. The roadway 100 in this condition would be considered a baseline measurement, and may be used in determining the additional characteristics of measurements and methods disclosed herein. For example, a baseline reading for flex, or stress, or moisture may be taken at the initial installation—of which will allow for calculations based on deviation over time from the baseline metrics.

Figure 2:
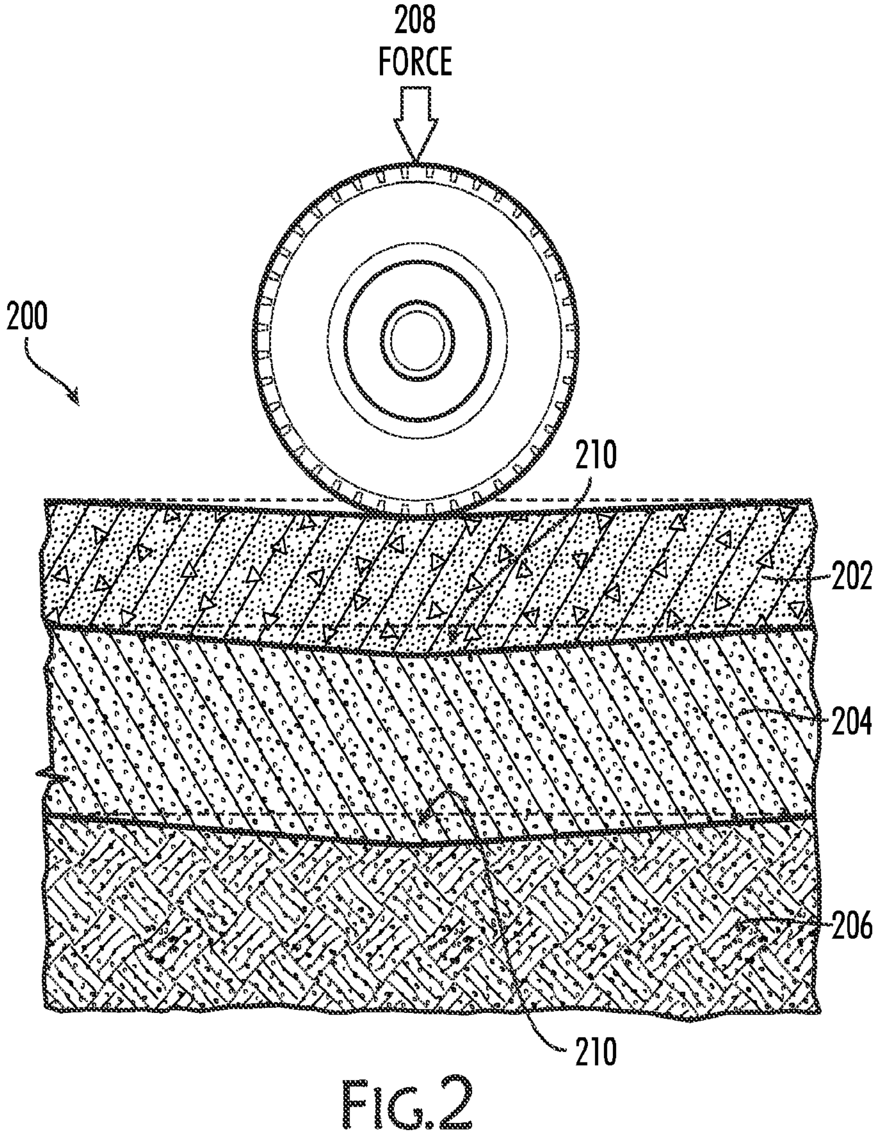
FIG. 2 is an illustration of an example roadway under wheel load transfer force.

Referring now to FIG. 2. An example of wheel load transfer force 208 causing deformation in a roadway 200, constructed similarly as the roadway in FIG. 1. Force 208 from the wheel places inelastic force on the pavement 202, the base/subbase 204, and the subgrade 206, causing subgrade deformation 210 and an eventual failure of the underlying road structure. As discussed previously, certain force is elastic, and under correct design parameters a road may take repetitive force for many cycles before showing a weakening or an accumulation of inelastic force that leads to failure or deformation of the subgrade 206.

The disclosure herein is associated with the monitoring and data analytics captured underneath the roadway, that is in the layers beneath the pavement 202, and include the base/subbase layer 204 and subgrade layer 206. The very nature of monitoring these under pavement 202 layers has presented difficult and is an area in which hidden damage from erosion and inelastic forces accumulate to cause failure. One example herein incorporates the sensor enabled geogrid within the base/subbase layer during construction, and as such is equipped with sensors to provide time series analysis of the structural health and integrity of the roadway or other infrastructure, in which algorithms may make estimates upon failure rate, lifetime, and maintenance need. By incorporating the disclosure herein roadways may become safer, more reliable, and cost less to maintain.

Figure 3A:
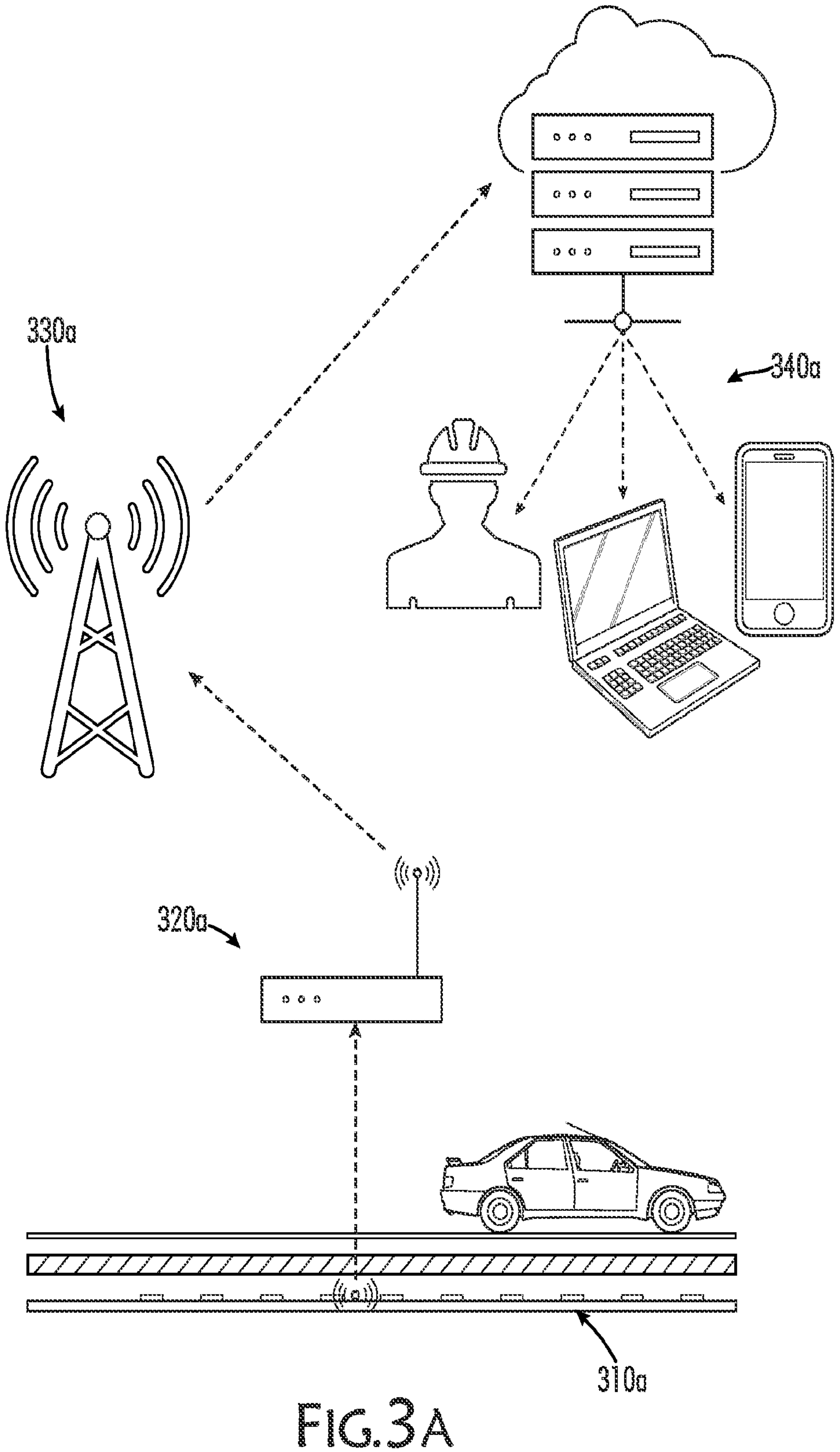
FIG. 3A is an illustration an example of an IoT platform for monitoring and detecting subgrade deformation.

Turning now to FIG. 3A, of an example of an IoT platform for monitoring and detecting subgrade deformation is disclosed. The system of infrastructure monitoring comprises a sensor enabled geogrid 310*a*. The sensor enabled geogrid 310*a* is equipped or configured with one or more sensors, wherein the one or more sensors may be an inertial measurement unit ("IMU"), a flex sensor, a strain gauge, a temperature sensor, and/or an ambient light sensor. The sensor enabled geogrid 310*a* is further configured to a microcontroller 320*a*, either electrically connected (directly) or through a wireless protocol. The microcontroller 320*a* may be housed in a sensor pod or a protective casing that also supplies power for operating the microcontroller. In this regard the microcontroller 320*a* serves as the brain or central intelligence gathering unit at the edge of the network, wherein it receives signals from the one or more sensors and may include onboard processing such as filtering, prior to transmitting the signals to a gateway or device for transferring or processing the signals further. The microcontroller 320*a*, in one aspect, is in communication with a computing network 330*a* or backend system, typically through a gateway device 340*a*, wherein data received from the sensors is analyzed and monitored. The data analysis is used to determine the status of or the health and condition of the infrastructure in real time through a time series analysis of the sensor information. In one aspect, an algorithm detects a baseline status, and deviations from the baseline are monitored, including gradual changes in the subbase/base layer that may be interpreted as inelastic deformation. In other aspects, an algorithm detects a threshold for elastic deformation and determines parameters for when inelastic deformation is occurring. For example, from heavy trafficking or loading outside of the parameters for the designed infrastructure.

In another aspect a set of apparatus' for roadway subgrade deformation is disclosed. The apparatus' include a sensor enabled geogrid 310*c* (comprising inertial measurement units 340*d*, and strain gauges 330*d*), a sensor pod 320*d*, a gateway device, a computing device/backend system, and a user mobile computing device or viewing device in which a user may interact with the system and data and may input parameters into algorithms. In one aspect, the sensor pod comprises a microcontroller, a power supply, a communications adapter, and wired or wireless communication cables or input. The sensor pod and microcontroller may be configured to one or more sensors, typically either an electrical or an optical sensor (e.g. flex sensors, strain gauges, moisture sensors, and temperature sensors). In one aspect, the sensor pod and microcontroller may be configured to IMUs, such as accelerometers, gyroscopes, magnetometers, and barometers. Together, the sensors and inertial measurement units, form a "sensor fusion" wherein a multitude of distinct sensors are utilized to make an inference about an event or condition based on accumulated sensor data. This inference may be derived by computational software analyzing the signals from the one or more sensors, in combination with one or more IMUs to generate an understanding of the subgrade, including any deformation, change, settling, or movement. The information may lead to further understanding of mechanical wear, geological interactions, and deformation of subgrades over a period of time and as it relates to location, and trafficking conditions, usage, weather patterns, and other geological or anthropomorphic events.

Sensor fusion derives the benefit of reliability, as sensor error can be detected and corrected for with the sensor swarm. As the disclosure herein is intended to be deployed within an environment that may not see continual maintenance and or attention, it is imperative that should one sensor or instrument fail, the sensor swarm be equipped to adjust calculations and compensate without the need or repair or replacement. Thus further adding economic benefit to the present disclosure. In one aspect, a failing sensor may be targeted and brought offline, wherein other sensors in the swarm may take over readings, in this example if an IMU is utilized with a moisture sensor to determine the status of subgrade deformation, when an IMU fails a flex sensor may be utilized to “fill in” the data, wherein the flex sensor may provide the data needed under a different algorithm to approximate change in the subgrade. In the previous aspect, the model of “swapping” sensors is configured utilizing a variety of algorithms, wherein each combination or combinations of sensors produces feedback that may be analyzed and utilized in decision making by geotechnical engineers or site engineers. One such algorithm may be a decision tree: another may be neural network for generating inferences from the remaining online sensors. In this regard, redundancy is inherent in the system and built into the sensor fusion, providing accurate and reliable readings even as sensors fail due to time, stress, battery or power.

Figure 3B:
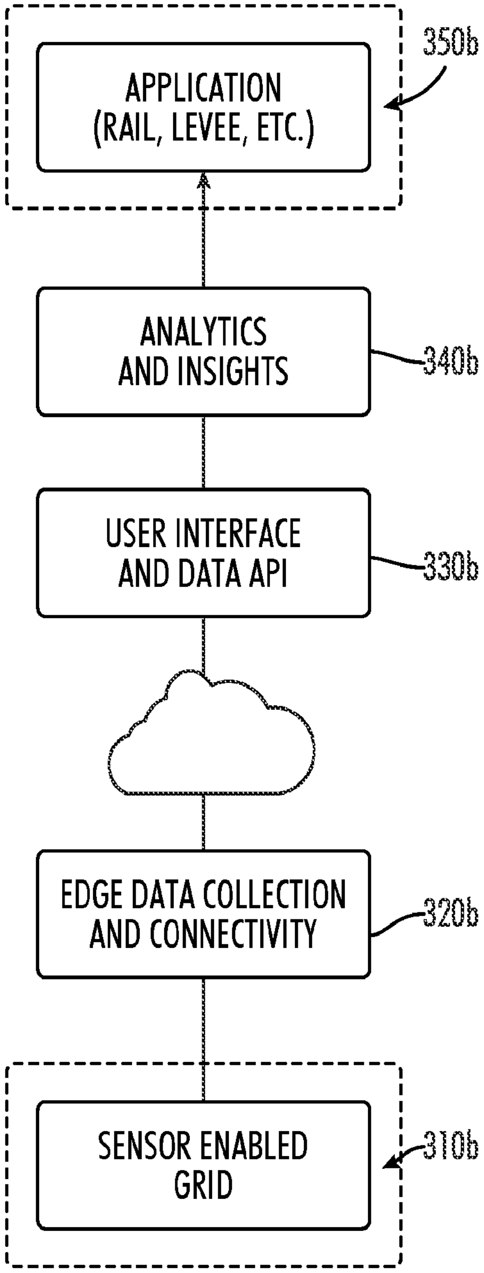
FIG. 3B is a flow diagram of a sensor enabled geogrid system and method for detecting subgrade deformation.
Figure 3C:
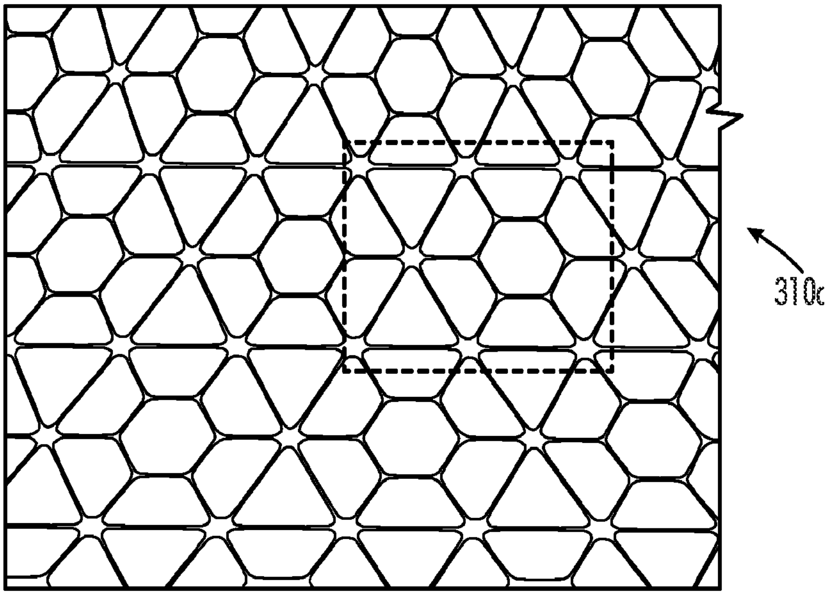
FIG. 3C illustrates an example of a sensor enabled geogrid.
Figure 3D:
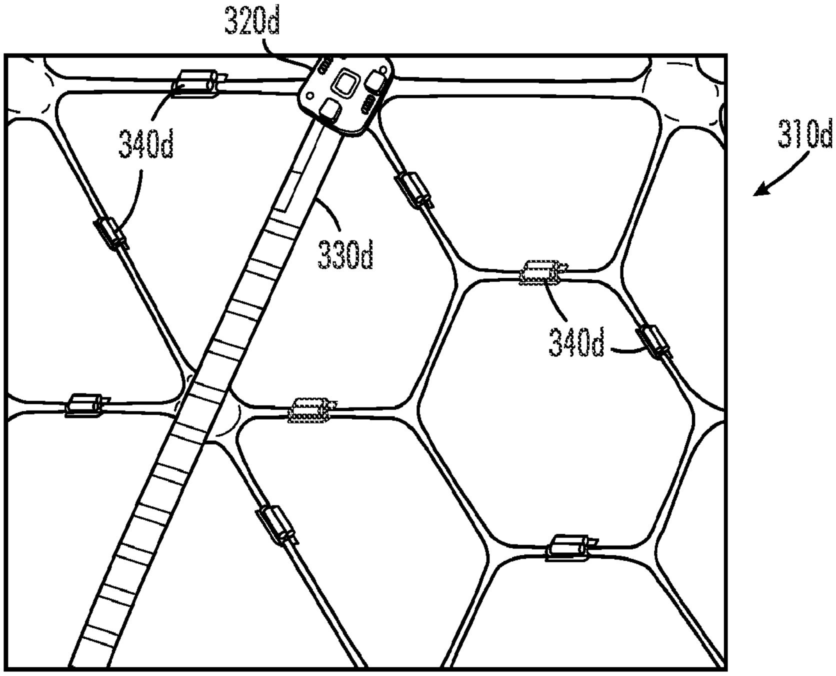
FIG. 3D illustrates an example exploded view of FIG. 3C of an example sensor enabled geogrid.

In another aspect, a plurality of sensors and IMUs are equipped to, and configured with, a geogrid to form a sensor enabled geogrid (as depicted in FIG. 3D). The sensor enabled geogrid provides sensor fusion from the plurality of sensors and gathers intelligence and understanding of roadway infrastructure, including the status of the subgrade and layers beneath the pavement. The plurality or one or more IMUs may be utilized in combination with other sensors or alone, depending upon the size and scale of the project, the budget goals, or the design parameters. Data acquired from the one or more IMUs is transmitted along a series of communication pathways and to backend systems. One communication pathway is through a gateway device, which sits as an edge device, and performs the task of relaying information acquired from the one or more IMUs and sending it to the correct destination. The gateway may also perform useful tasks such as additional computing for onsite investigation, as well as it may contain sensors and take readings at the edge environment. This type of system, as described herein, is often referred to as an Internet of Things (IoT) platform. In an IoT platform physical objects are embedded with sensors, software, and technologies that allow for connecting and exchanging data to systems over the Internet.

In another aspect a method for monitoring and detecting subgrade deformation is disclosed. The method includes installing a sensor enabled geogrid equipped with IMUs in a substrate material such as a base/subbase and/or subgrade. Then providing a data collection assembly, such as a sensor pod or other data collecting computer. Then, providing a communication link from the sensor enabled geogrid (e.g. via a sensor pod) to a gateway. The gateway then transmitting over a network to a computing device at a backend system with applicable hardware and software for performing analysis, calculating, computing, diagnosing, and monitoring the data collected by the sensor pod and transmitted through the gateway. Then monitoring the information in either real time or time series for subgrade deformation. In monitoring the information is analyzed and processed with an infrastructure processing engine, wherein the engine identifies in the information changes in the status of the roadway.

Referring to FIG. 3B a flow diagram of an example data flow from the system disclosed herein. Wherein the sensor enabled geogrid, embodied with a sensor fusion network, receives and collects data from the base/subbase and/or subgrade layer at the edge of a network. In one aspect, infrastructure such as rail and levee are the target infrastructure for monitoring in which the IoT platform 350*b* delivers insights into subgrade status, health, and condition. This chain of events, wherein analytics and insight is developed from the sensor enabled geogrid, begins with the electrical signals/communication derived from the sensors embedded or configured to the sensor enabled geogrid 310*b*. Those sensors are in electrical communication to a sensor pod, which is in turn in electrical communication through a gateway device, thus making up the edge data collection system and assembly. The edge data collection system is in electrical communication, typically through cellular signal, to a backend system for processing the analytics and insights 340*b*. The user may view the data from the sensors on an IoT platform/application 350*b* connected through a user interface and data API 330*b* to the backend system.

In some embodiments, the presently disclosed subject matter provides a sensor-enabled geogrid system for detecting subgrade deformation. The sensor-enabled geogrid system includes a sensor-enabled geogrid, a sensor pod or data receiving device, and a communication means or network for collecting information (e.g. data, signals, information) from the sensors regarding the base/subbase layer or subgrade of infrastructure (e.g. roadways, rails, levees). Further, in another example, the computing network, also known as a backend system, includes a platform (dashboard) and a user facing application that reports the status and provides real time or time series updates regarding information received from the sensors.

Turning now to FIGS. 3C and 3D, in one aspect, the disclosed sensor-enabled geogrid system and method includes a geogrid as the sensor “carrier” that may be used for detecting deformation of a subgrade. In other embodiments the IMU’s may be placed or located near the sensor enabled geogrid, wherein the geogrid may have other sensors placed on it-such as electronic and optical sensors, e.g. strain gauges and flex sensors. The strain gauge or the flex sensor 330*d* may be operatively configured or mounted to an elongated member of the sensor enabled geogrid, wherein, when the elongated member experiences flex or strain, such a reading can be sensed and transmitted to a sensor pod. Typically, for electrical sensors, such measurement would be a change in resistance along a pathway of the member of the geogrid. Similarly, the IMU’s 340*d* may be operatively configured to an elongated member or any other feature of the sensor enabled geogrid, wherein a tilt in axis would be sensed or registered by the IMU and transmitted to the sensor pod. In similar embodiments, the sensor enabled geogrid may be a multi-axial geogrid in configurations such as uniaxial, biaxial, triaxial, and hexagonal, to name a few configurations. In other embodiments the sensor carrier or sensor enabled geogrid may be a geofabric or other underlying soil retaining material such as a geosynthetic, geonet, geomesh, or geocomposite.

In some embodiments, the presently disclosed sensor-enabled geogrid system and method provide a sensor-enabled geogrid 310*c* and 310*d* that is easy to install and provides an easy mechanism for monitoring the status or condition of subgrade, thereby enabling detection of subgrade deformation. The system is capable of plug and play aspects and being able to integrate within new infrastructure projects or be installed in a remedial basis on current existing infrastructure. For example, the system is configured to geogrid placed at, for example, a roadway construction site. The sensor enabled geogrid may be “turned on”

when the sensors are configured to a nearby sensor pod and gateway, thus this allows deployment at the construction phase, and the ability to update hardware and software on the system as the main processing components are not within the buried infrastructure. The ease of installation includes the ability to run contiguous sections of sensor-enabled geogrid to form a blanket of coverage, this process is the same as laying non sensor enabled geogrid, and wherein the plurality of sensors on the plurality of sensor-enabled geogrids work in unison and transmit real time feedback regarding the status of the entire installed area.

In some embodiments, the presently disclosed sensor-enabled geogrid system and method provide information and/or data about the base/subbase and/or subgrade layer of roads, rail, and infrastructure, that may be useful in many applications, such as, but not limited to, condition-based maintenance, lifecycle cost optimization, remaining life estimation, and capital planning. Further, the systems and methods disclosed herein may comprise aspects of other IoT platforms, and may be combined with other systems, and integrated to form a more complete package of infrastructure—for example, a construction project and construction management software may include the disclosure herein as an aspect of the program when installing or updating infrastructure construction projects.

In some embodiments, the presently disclosed sensor-enabled geogrid system and method uses a sensor-enabled geogrid to provide "below the surface" information and/or data about the status of the subbase or subgrade layer, wherein the "below the surface" information may not otherwise be attainable by conventional means such as by visual inspection. The below the surface data and feedback removes the subjectivity and unknown of topside visual inspections. In one example, roadway pavement cracking on the surface is indicative of deeper underlying conditions within the substrate.

In some aspects, microcontrollers can be utilized, or in other cases, general purpose or special purpose computing devices. In one aspect a microcontroller is configured with a processing unit, cache memory, non-transitory memory such as RAM, volatile or non-volatile storage system, and is equipped with a network adapter, and I/O interface. In other embodiments a microcontroller may have built in sensors and/or an array of features such as a timer, accelerometer, and more. Microcontrollers possess several distinct advantages: first, they typically have a low power requirement. Second, they are easy to use, rugged, and come with universal applications. Third, the overall cost and composition is low. Fourth, the interoperability is high—a standard feature set of data RAM, non-volatile ROM, and I/O ports allow for access to a plurality of input devices. Additional benefits of microcontrollers and adaptation of those controllers to the disclosure herein will be known to those of skill in the art.

In one aspect a sensor pod is configured to communicate via a data cable to a gateway. Wherein the sensor pod is configured to the sensor enabled geogrid and the IMU's. Thus, the sensor pod serves as the recipient of information from the sensor fusion or swarm. A gateway may be equipped to the sensor pod or may be in direct communication with the sensor fusion. In one aspect, the gateway is a general purpose computer or microcontroller that is configured to receive data from the sensor pod or sensor fusion, wherein the gateway is equipped to perform computational action on the data and/or to forward the collated or accumulated data through a communications network to a backend system.

The gateway and system communication network may be a telecommunications network such as a cellular network, including but not limited to edge, 3G, 4G, 5G, LTE, satellite transmission, radio frequency (RF), microwave transmission, and millimeter wave transmission. Further, the telecommunications network may consist of wireless aspects of WiFi, Wide Area Networks, Bluetooth, long range radio communication (LoRa), Near Field Communication (NFC), and the various standards associated therewith such as WiFi 5. WiFi 6, WiFi 6e, Bluetooth 2.0, 3.0, 4.0, 5.0, 5.0+, and other such standards as will change or occur from advancements in the field. Further, network communications may also include wired connections such as twisted pair, coaxial, fiber optics, or other such network infrastructure and/or spectrum that will be provided for herein. In one aspect the gateway is equipped with Bluetooth and NFC as well as WiFi and cellular CDMA/GSM standards. The communications network, as common in other IoT platforms, will often travel through a series of steps or interfaces before reaching a computing network that is equipped to process and/or provide an interface for interaction with the data, and may further be provisioned for access through a website and an API layer.

The user devices for viewing the backend system or the IoT platform may comprise mobile computing devices or computing devices. Such examples include mobile phone computers, tablet computing devices, or laptop computing devices, all of which are typically equipped with an input device such as a touch screen or keyboard or mouse and with a display that allows a user to view the input along with information on the IoT platform.

In the sensor fusion network, many sensors may be applied to develop a "fusion" or "swarm" of data input that allows for advanced analytics and a deeper understanding of the subgrade. In a brief example, an IMU paired with a strain gauge may form a sensor fusion. Briefly, regarding strain gauges, strain can be positive (tensile strain), or negative (compressive strain). Strain is dimensionless, unless configured in a manner to detect dimension, in practice the magnitude of strain is low and often measured in microstrains ($\mu\in$). Therefore, strain is the amount of deformation of a body due to applied force. More specifically, strain ($\in$) is defined as the fractional change in length with the following equation:

$$\mathcal{E} = \frac{\Delta L}{L}.$$

Another aspect of strain gauges is to clearly define and understand the parameter or sensitivity to strain. This sensitivity is often expressed quantitatively as the gauge factor or GF. We can determine the gauge factor using the following equation:

$$GF = \frac{\frac{\Delta R}{R}}{\frac{\Delta L}{L}} \text{ or } \left(\frac{\Delta R}{R}\right)/\in.$$

Wherein the gauge factor GF is defined by the ratio of the fractional change in electrical resistance to the fractional change in the length (strain). Further, in other aspects Fiber Bragg Grating may be used to sense strain, by creating periodic variation in the refractive index of the fiber core, which in turn generates a wavelength specific dielectric mirror. In other aspects, the fiber optic sensors may use Brillouin optical time domain reflectometry to measure changes in internal strain and temperature of the subgrade and/or subbase.

Another sensor that may be applied within the sensor fusion is a flex sensor. Flex sensors may be either optical or electrical. Electrical flex sensors may be comprised of phenolic substrate resin, conductive ink, and a segmented conductor, they require understanding of the resistance generated when bent. In one example a flat flex sensor measures 25 KΩ, when bent at 45° the flex sensor measures 62.5 KΩ, and when bent 90° the flex sensor measures 100 KΩ. Depending on the flex sensor and its specifications the resistance generated will differ and thus when described or configured herein the variability is to be expected across devices. Optical flex sensors, otherwise known as fiber optic flex sensors, may be utilized to indicate the amount of bend or flex on a fiber optic tube or channel.

Additional infrastructure concepts are facilitated with an understanding of materials utilized for geogrid manufacture. Including when mounting or adhering, or manufacturing sensors with geogrids. In other aspects, geogrids may be removed and the sensor system constructed to geofabrics or other medium in which sensing may indicate subgrade deformation. For purposes of explanation, the table provided below highlights the differences in geosynthetic materials. It is important to note that the embodiments herein are not limited to any one type of geosynthetic material, as disclosed the embodiments can be configured, attached, or adapted to a multiplicity of materials, including the substrate and/or underlying soil itself. Furthermore, a combination of materials may be utilized to accomplish the disclosure herein, including examples of layering a sensor enabled geogrid with a sensor enabled fabric.

| Geosynthetics | Polymeric Materials | Structures | Application Area | Major Functions |
|---|---|---|---|---|
| Geotextiles | Polypropylene (PP), Polyester (PET), Polyethylene (PE), Polyamide (PA) | Flexible, permeable fabrics | Retaining walls, slopes, embankments, pavements, landfills, dams | Separation, reinforcement, filtration, drainage, containment |
| Geogrids | PP, PET, high density polyethylene (HDPE) | Mesh-like planar product formed by intersecting elements | Pavements, railway ballasts, retaining walls, slopes, embankments, bridge, abutments | Reinforcement, separation |
| Geonets | Medium- density polyethylene (MDPE), HDPE | Ney-like planar product with small apertures | Dams, pipeline and drainage facilities | Drainage |
| Geomembranes | PE, polyvinyl chloride (PVC), chlorinated polyethylene (CPE) | Impervious thin sheets | Containment ponds, reservoirs, and canals | Fluid barriers/ liner |
| Geocomposites | Depending on geosynthetics included | Combination of geotextiles and geogrids/ geonets, geomembranes and geogrids | Embankments, pavements, slopes, landfills, dams | Separation, reinforcement, filtration, drainage |

Geotextiles also known as geofabrics are one concept highlighted in the table above and in which the disclosure herein may be configured with. There are three ways a geotextile can be manufactured: they are either knitted, woven, and nonwoven or any combination thereof. The distinction between woven and nonwoven is that a woven geotextile is produced by the interlacement of warp and weft yarns. These yarns may either be spun, multifilament, fibrillated, or of slit film. Nonwoven geotextiles are manufactured by mechanically interlocking or thermally bonding the fibers/filaments. The mechanical interlocking is attained through needle-punching.

With regard to function of geotextiles, they operate in several distinct functions and bear similarities to geogrids and geosynthetics. The first being separation, wherein the geotextile provides separation of particles and prevents mixing of substrates and/or underlying soils. Two such issues are fine-grained soils enter the void of the aggregate base and the aggregate punches into the fine grained soil. The first issue is a concern since it avoids adequate drainage and greatly reduces the strength of the aggregate layer which hastens infrastructure failure/erosion. The second issue is a concern because it decreases the effective thickness of the aggregate layer which also hastens road failure and/or increases infrastructure maintenance. The second prominent function of geotextiles is stabilization. The effectiveness of the geotextile stabilization results from two factors. First, the aggregate is compacted above the geotextile and individual stones are configured, which places imprints in the subgrade and geotextile. When configured, aggregates are fixed into a position, which stabilizes the aggregate base layer. The stabilization of the subgrade soil due to geotextile can change the soil failure mode from local shear to general shear. Due to this change in shear, an additional load is permitted before the soil strength is surpassed which allows for a reduced aggregate base layer. A third benefit of geofabrics is reinforcement. The benefits of reinforcement are reliant on the extent of deformation allowable in a given system. Filtration, is an additional function, wherein the defined openings in the geotextile that hold soil particles also allow for and permit fluid movement and flow. The filtration in this aspect filter the soil out, holding it in place while permitting fluids to flow through and egress.

Geogrids are geosynthetics formed with open apertures and grid-like configurations of orthogonal or non-orthogonal ribs. The ribs are often referred to as elongated members, due to the shape and radial connectivity. Further, geogrids have a top and bottom surface and may be comprised of polymeric material and other additivities to increase ground stabilization. Geogrids are often defined as a geosynthetic material consisting of connected parallel sets of tensile ribs (elongated members) with apertures of sufficient size to allow for strike-through of surrounding soil, stone, or other geotechnical material. Several methods exist for producing geogrids. For example, extruding and drawing sheets of Polyethylene (PE) or Polypropylene (PP) plastic in one or two or even three or more directions, or weaving and knitting Polyester (PET) ribs. Geogrids are designed mainly to satisfy the reinforcement function for a variety of infrastructure, including roads, rail, buildings, ground erosion, and more, however, ancillary benefits such as material cost savings and more are applicable.

Regarding the structure of geogrids, the ribs of a geogrid are defined as either longitudinal or transverse. The direction which is parallel to the direction that geogrid is fabricated on the mechanical loom is known as roll length direction, Machine Direction (MD), or longitudinal direction. On the other hand, the direction which is perpendicular to the mechanical loom and MD in the plane of geogrid, is known as Transverse Direction (TD) or cross machine direction. In other words, the longitudinal ribs are parallel to the manufactured direction (a.k.a. the machine direction): the transverse ribs are perpendicular to the machine direction. Some mechanical properties of geogrid such as tensile modulus and tensile strength are dependent on the direction which geogrid is tested. In a geogrid, the intersection of a longitudinal rib and a transverse rib is known as a junction. Junctions can be created in several ways including weaving or knitting.

Regarding the production of geogrids, geogrids are produced by either welding, extruding, and or weaving material together. Extruded geogrid is produced from a polymer plate which is punched and drawn in either one or more ways. Various aperture types are shaped based on the way the polymer sheet is drawn. Drawing in one, two or three or more directions results in production of uniaxial, biaxial, triaxial, and various other multiaxial geogrids. Polypropylene (PP) or polyester (PET) fibers are generally used to produce woven geogrids. In most cases, these fibers are coated to increase the abrasion resistance of produced geogrid. Manufacturing process of welded geogrid is by welding the joints of extruded polymer woven pieces. Geogrids are also categorized in two main groups based on their rigidity. Geogrids made from polyethylene (PE) or polypropylene (PP) fibers are usually hard and stiff and they have a flexural strength more than 1,000 g-cm. Flexible geogrids, are often made from polyester (PET) fibers by using a textile weaving process. They usually have a flexural strength less than 1,000 g-cm.

While geotextiles can be used for separation, drainage and filtration, or reinforcement, geogrids are mainly used for reinforcement and/or stabilization applications. Geogrids can also provide confinement and partial separation. The confinement is developed through the interlocking mechanism between base course aggregate particles and geogrid openings. The interlocking efficiency depends on base course aggregate particle distribution and the geogrid opening size and aperture. In order to achieve the best interlocking interaction, the ratio of minimum aperture size over D50 should be greater than three. The effectiveness of interlocking depends on the in-plane stiffness of the geogrid and the stability of the geogrid ribs and junctions. The reinforcement mechanisms in geogrid base reinforced infrastructure sections include lateral restraint (confinement), increased bearing capacity and tension membrane effect. Aggregate base layer lateral restraint is the fundamental mechanism for geogrid reinforced infrastructure. For example, a vertical load applied on the surface of the infrastructure would cause lateral spreading motion of the aggregate base materials. As the loading is applied on the surface of the infrastructure, tensile lateral strains are generated in the base layer causing the aggregates to move out away from the loading. Geogrid reinforcement of infrastructure sections restrains these lateral movements, which is known as lateral restraint. In doing so geogrid reinforcement changes the "failure location" from the weaker subgrade soil to the stronger aggregate layer.

Figure 4A:
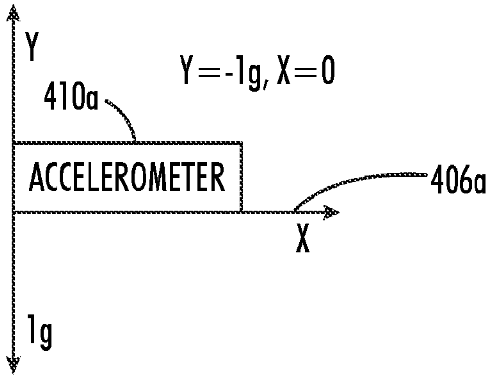
FIG. 4A illustrates an example of inertial measurement units in correlation to FIG. 4B.
Figure 4B:
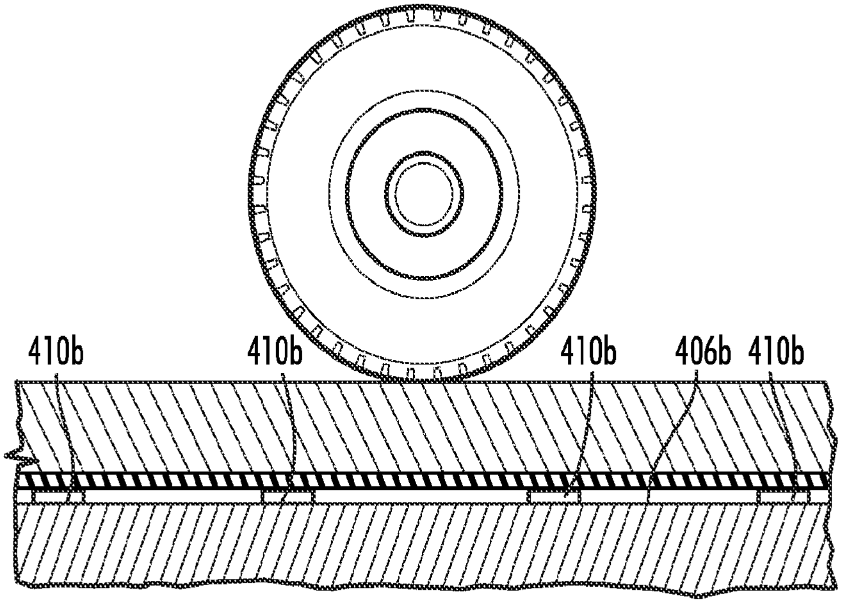
FIG. 4B illustrates an example of a roadway with the corresponding inertial measurement unit in FIG. 4A.

Turning now to FIGS. 4A-D, wherein an example of a detection method using IMUs is disclosed. In the example, an accelerometer IMU 410*a* is depicted in FIG. 4A wherein the X and Y initial readings are recorded as a baseline 406*a*. This baseline corrects for errors in the sensors, temperature variance, the installation positioning, as well as electromagnetic interference, gravity, and other variables. FIG. 4B depicts a roadway that is in elastic response to force and the accelerometer in FIG. 4A depicts the relative position. It is important to note a sensor fusion is disclosed, wherein multiple accelerometers 410*b* are placed within the base/subbase and/or subgrade for a network or swarm detection and feedback. In the example the force from the wheel is exerted and the IMU position is unchanged with regard to angle of axis or tilt as the roadway is in an elastic state capable of handling the force without deformation.

Figure 4C:
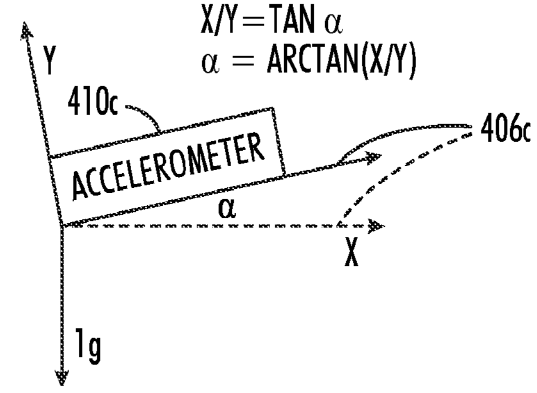
FIG. 4C illustrates an example of inertial measurement unit assembly in correlation to FIG. 4D.

As a rut is formed from exceeding the design specification or failure in the roadway the accelerometers change position as indicated in FIG. 4C. The change in relative position is detected across the sensor fusion, wherein the movement change in the X, and Y readings in the accelerometer 410*c* will reflect an amount of "tilt" 406*c* or variance/change from the baseline measurement. As the tilt or change continues the feedback can alert technicians and geotechnical engineers to the changes underneath a roadway. Together, a plurality of IMUs form a sensor fusion for additional readings and understanding. For instance, the present disclosure may also include moisture sensors that can show "patches" or areas under a roadway that are accumulating excess moisture. Similarly, a flex sensor may be applied to the geogrid, wherein, along with the accelerometers, display clear diagnostic information of the underlying infrastructure of a roadway.

Figure 4D:
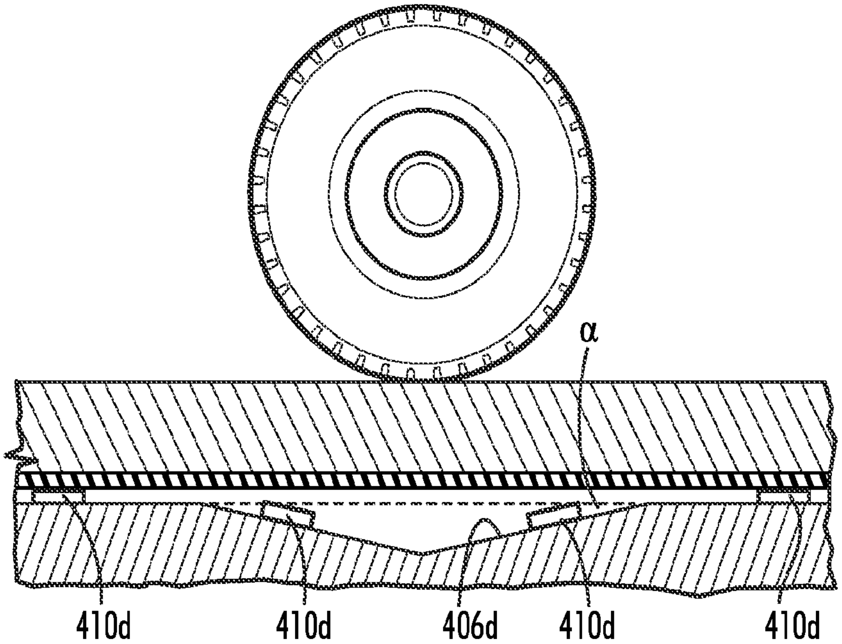
FIG. 4D illustrates an example of a roadway with the corresponding inertial measurement unit assembly in FIG. 4C.

In the example of FIG. 4D, the accelerometer sensors 406*d*, IMUs, are installed on a prepared subgrade, subgrade before aggregate (rocks, stones or various sizes) and pavement are installed. The accelerometers within the prepared subgrade may be equipped and configured to have three axes (X, Y. and Z), and may have an initial reading of 1 g or approximately 9.8 m/sec^2 in acceleration for orientation. In one example, if the Z axis is pointed directly in line with the gravitational pull or the earth, the X and Y axes would reflect an indication of zero force. As rutting occurs 406*d*, as depicted in FIG. 4D, or the Z moves from its placement the X and Y axes will register a change or a variance from the starting position. By utilizing this detection of change in orientation, a time series or real time model can diagnose and understand conditions as they occur and alert to subsurface deformation. Leading to instantaneous feedback as well as improving the overall safety and reliability of roadway infrastructure.

An example of a detection method that may be deployed with the current system such as on an infrastructure detection engine, includes:

i. Installing accelerometers onto a subgrade wherein geogrid is deployed, typically by adhering sensors to the geogrid members;
ii. Verifying accelerometers placed along most likely traveled wheel path;
iii. Acquire X and Y initial readings, baseline readings;
iv. As trafficking occurs, monitor accelerometers and readings;
v. Formulate, based on trafficking data time series algorithm to associate with normal loading;
vi. Calculate tilt angle (α) in FIGS. 4C-4D, from X and Y readings, the change (Δ) from baseline;
vii. Detect changes in tilt and or normal loading patterns; and
viii. Alert or signal if (Δ) from baseline exceeds a set threshold parameter.

In additional embodiments, the disclosed system may be installed in the aggregate of the base and subbase layers as methods for detecting movement without the use of a geogrid or geofabrics. In certain situations, such as an installation at a working platform, or where a large piece of equipment or machinery is being installed, a sensor fusion as disclosed herein may aid in understanding the geotechnical forces, in particular deformation, undergoing when moving the equipment into place. For example, a wind turbine installation on a rural roadway, the heavy equipment may be too much for the geotechnical design. A solution would be continuous monitoring through the sensor enabled geogrid and sensor fusion to detect changes as the installation proceeds. Possibly preventing catastrophic failure of the roadway and injury to those involved.

Figure 5A:
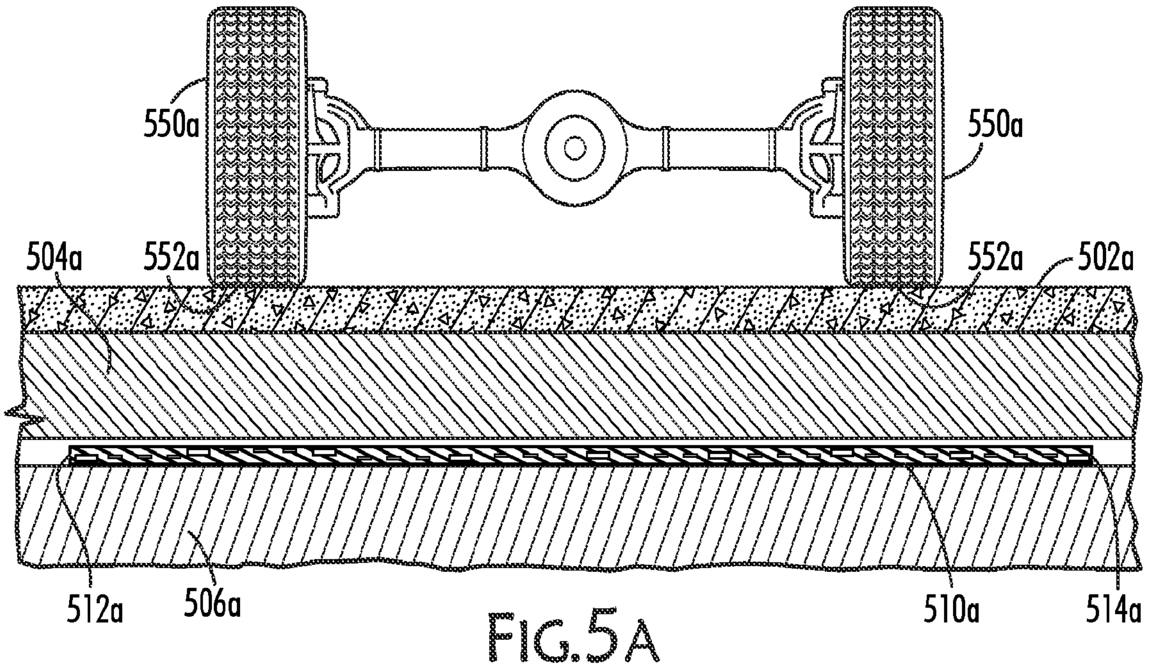
FIG. 5A illustrates an example of flex sensors with an inertial measurement unit assembly.
Figure 5B:
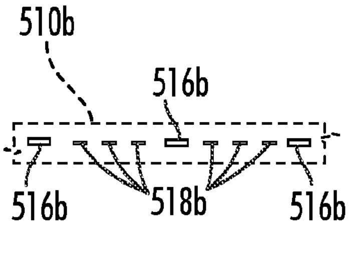
FIG. 5B illustrates an example of a sensor array on a geogrid experiencing no subgrade deformation.
Figure 5C:
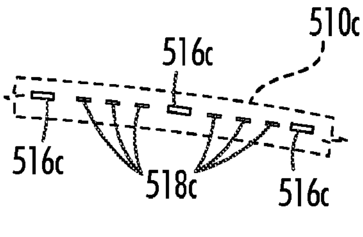
FIG. 5C illustrates an example of a sensor array on a geogrid experiencing subgrade deformation.

Turning now to FIGS. 5A-C, in the example, subgrade deformation may be detected utilizing a combination of flex sensors 510*a* and IMU's 514*a* to form a sensor fusion 512*a*. The flex sensors 510*a* bring an additional dimension by detecting flex or bending applied to the sensor body. Flex sensors may be either electrical or optical, or a combination of both. In coordination with IMUs 514*a* or alone, a flex sensor 510*a* can target the location of fatigue within the subgrade and provide early warning signs as well as a linear relationship with flex over time.

In the example of FIG. 5A, a wheel 550*a* presents force downward on the infrastructure at a contact point 552*a*. The contact point 552*a* may be of particular importance for loading and location of IMU's as it likely faces the greatest amount of inelastic force. The infrastructure is comprised of pavement 502*a*, a base/subbase layer 504*a*, and a subgrade layer 506*a*. Further, a sensor enabled geogrid, comprising a sensor fusion 512*a* is disclosed between the subbase layer 504*a* and the subgrade layer 506*a*.

Commercial flex sensors are limited to around several inches, which presents problems when reading flex on an object such as a road. This problem is overcome with the sensor fusion, wherein strategically placed sensors (e.g. FIG. 5) allow for a sensor grid or web to form, in particular around loading areas such as contact points 552*a*, therefore enabling detection across the entire structure with higher sensitivity placed near loading. For example, the placement can be structured across key areas or targeted to traverse a roadway at a certain distance for monitoring and detection of subgrade deformation.

In the example of FIGS. 5B-C, the IMU sensors 516*b* and 516*c*, respectfully, are spaced apart, wherein the flex sensors 518*b* and 518*c* are occupying the voids to form the sensor fusion, which may also be termed a sensor network or sensor fabric, depending on the backing material or configuration. This positioning is but one orientation that allows for accurate readings and the formation of a sensor fusion network. Other positioning may be desired depending on the loading force and the goal of structural health and infrastructure monitoring. In the example, the network not only captures movement data, but also stress data, combining to form fatigue and display inelastic forces on the base/subbase and/or subgrade layers. In the example "sensor strip" or sensor fusion provides readings across the entire roadway and covers the wheel path. In FIG. 5B, an example of inelastic force is shown, wherein the sensor fusion is not experiencing tilt and would indicate there is no significant surface deformation presently occurring. In FIG. 5C, the sensor fusion is depicted experiencing subsurface deformation and the IMUs are experiencing tilt, wherein the right most IMU has a more severe tilt, thus indicating it is closer to the origin of the deformation. In this regard, the IoT platform, and engines therein may perform calculations to pinpoint the size and scale of the deformation, including the precise location so that targeted repair may occur. In other embodiments the sensor strip may be placed at strategic areas, for e.g. along the typical wheel path in a roadway or at a particular location such as before a bridge or by a known water source that may cause erosion.

Figure 6:
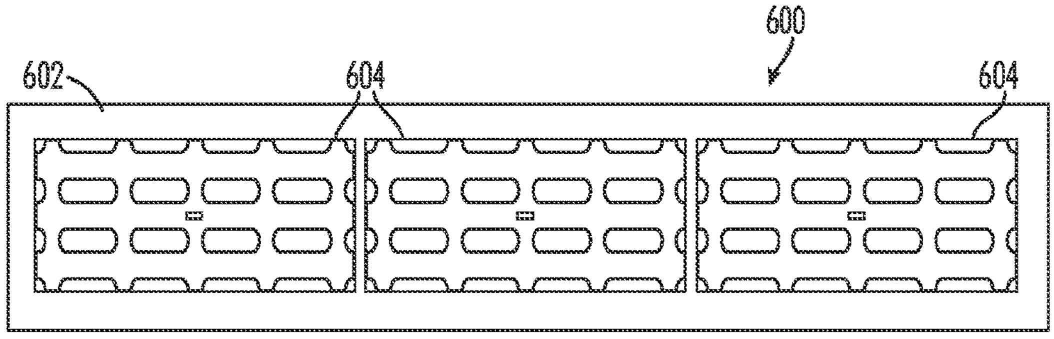
FIG. 6 illustrates an example of strain gauge installation on a carrier assembly such as a geogrid.

In the example of FIG. 6, strain gauges are located with IMU's to form a sensor fusion 600 or swarm network that is placed on a geogrid 604 within a subbase or subgrade layer of an infrastructure environment 602. In the example, strain gauges are disclosed on the top and bottom of a geogrid. These strain gauges may be traditional strain gauges with an insulating flexible backing which supports a metallic foil pattern or more advanced strain gauges such as fiber optic strain gauges. In operation, strain gauges detect the amount of deformation which causes electrical resistance, or in the case of fiber optics, the Fiber Bragg Gratings ("FBGs"), which change shape due to the strain/deformation. In one aspect, strain increases the light windows created by the FBG's and thus show strain on the fiber optic strain gauge. Thus, a strain gauge quantifies a load of an object, such as a tire on a geogrid, through the change in output signals versus the signal when the object was under no load. This holds true for both electronic strain gauges and optical strain gauges. The benefits of an optical strain gauge arrangement include the removal of electricity, allowing them to operate in areas with electromagnetic interference. Further, they have a slimmer profile, and can be embedded in many manufacturing and extrusion processes. However, optical strain gauges do suffer from relatively high coefficient of thermal expansion, thus it is often combined with a temperature sensor to correct for and compensate for temperature.

Figure 7:
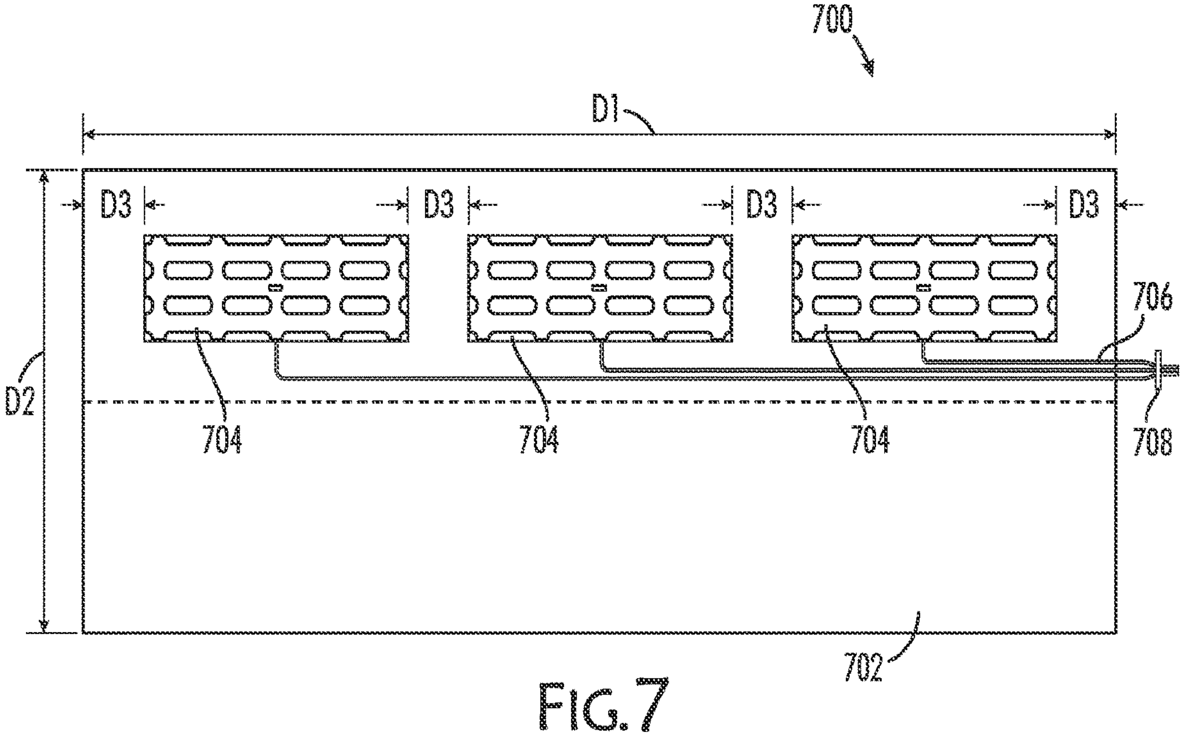
FIG. 7 illustrates an example of location positions for strain gauges on a carrier assembly such as a geogrid.

Referring now to FIG. 7, disclosing connections to a sensor pod in which collects the plurality of sensor data from the sensor enabled geogrid forming a sensor swarm 700. The strain gauges are connected to a sensor pod or gateway, in this instance through wired electrical means 706, and a connector 708 that inserts into a computing device such as a microprocessor that resides on the edge of the system with the sensors and geogrid. In this example, the sensor enabled geogrid forming a sensor network are spaced accordingly to detect strain across a roadway or a larger area thereby detecting even the smallest change in subgrade that may eventually lead to deformation and failure. In the disclosed embodiment, the sensor enabled geogrid installations are spaced with 3 inch gaps D3 to allow each strip or installation to experience its own strain. Thereby allowing the ability to directly detect or infer the condition of base/subbase and/or subgrade and through data analysis determine whether or not deformation or rutting is occurring. In other embodiments the strips may be one blanket or one continuous geogrid installation. As disclosed in FIG. 7, a distance D2 along the roadway environment may be utilized to save cost and still provide a viable sensor fusion for detecting subgrade deformation. In such embodiments the sensor fusion works with algorithms that pinpoint locations of strain, along with the tilt detection of IMU's which can target and reliably predict potential locations within the sensor fusion where deformation is occurring.

In one aspect, the sensor fusion is tied to an algorithm on the IoT platform that takes the location, the degree of tilt on the IMU, and the flex sensor or strain gauge reading as parameters and calculates the areas of deformation or inelastic stress occurring in a time series plot. The sensor fusion may also use sensors such as moisture, temperature, and others as described above to further refine the algorithm as additional input parameters. Further, the algorithm may be based on time series or interval analysis that allows for a timeline that may lead to better insight into design parameters and geotechnical engineering. The disclosure herein in some ways furthers the knowledge and understanding of infrastructure design, by allowing for previously unavailable metrics to be analyzed and reviewed.

Figure 8:
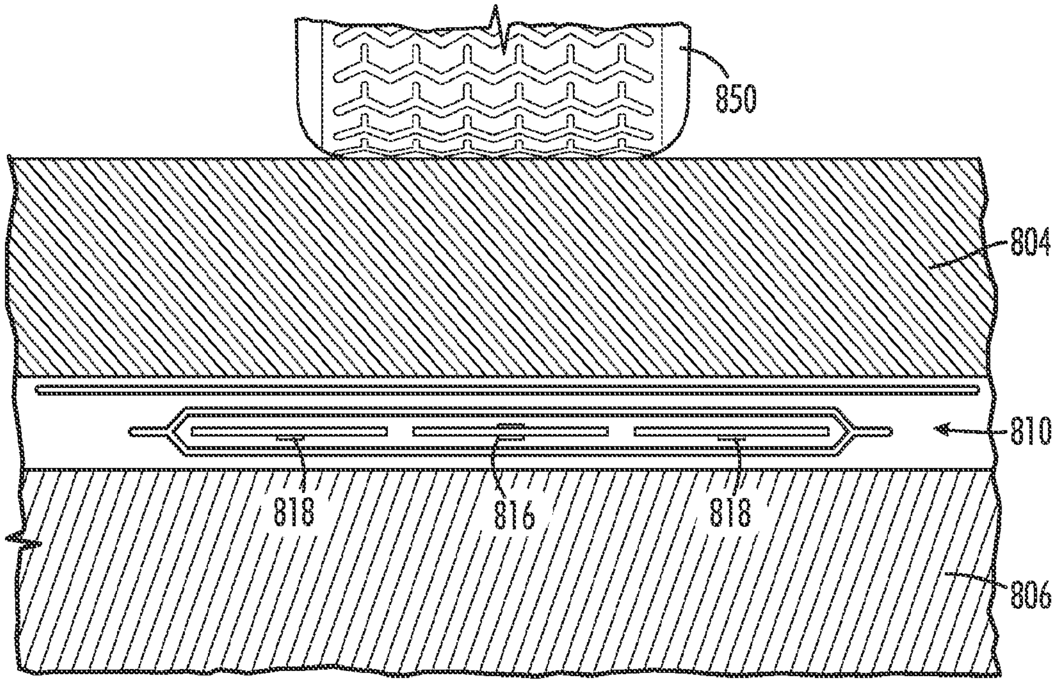
FIG. 8 illustrates an example carrier assembly with strain gauges installed on a subgrade.

Turning now to FIG. 8, an example sensor enabled geogrid is disclosed, wherein a wheel travel lane 850 is indicated, and an example sensor fusion 810 is installed within a roadway. This example depicts a system wherein the subgrade (clay) 806 is in elastic state and no deformation has occurred in any layer (pavement 804, subgrade). In this example a 3-foot space is tracked by the sensor fusion 810 and the arrangement of IMU's 818 and strain gauges 816 is as indicated. The sensor enabled geogrid is placed above a subgrade of clay and is positioned below aggregate and pavement. Not depicted is the connection of the sensor enabled geogrid to a sensor pod or gateway wherein the edge data is collected and transmitted to a central processing location, (a backend system) such as a server, a cloud server, or other networked computing infrastructure.

In the example, the networked computing infrastructure or backend system may comprise of a dashboard that may display a map of installed sensor enabled geogrid, which will indicate, typically through visual interpretation of data where deformation or rutting is occurring. In other aspects, the dashboard may be converted to an application, wherein geotechnical engineers or users may be able to view the infrastructure from an edge device. In even further embodiments the edge devices, sensor pod, and gateway may also have Ethernet or data access cables, wherein a field engineer may be able to plug directly into the intelligence at a given site, thereby performing remediation processes and visually seeing the performance.

Further, the gateway and the backend systems may also comprise a system for alerting workers, users, traffic, and more. In one example, the backend system may transmit a signal to a gateway device located near the detected subgrade deformation, the signal may trigger an audible or visual alarm at the gateway device to warn individuals within the vicinity. Similarly, the backend system may send an alert, such as an email communication or text message to a maintenance team or geotechnical engineer who is responsible for the specific section of roadway, the alert may pinpoint the location of the deformation and allow for crews or teams to respond and take preventative or curative measures.

Figure 9:
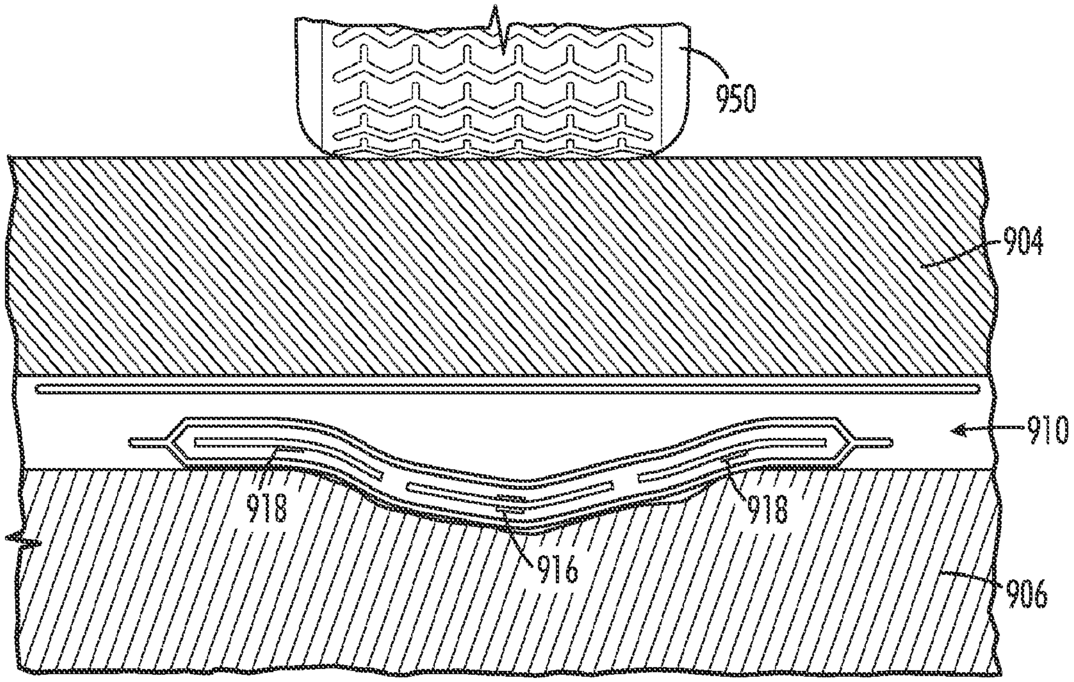
FIG. 9 illustrates an example of subgrade deformation on a carrier assembly.

Turning now to FIG. 9, displaying the example system of FIG. 8 wherein deformation or rutting has occurred in the subbase and subgrade layer 906. From the example, the position of the sensor enabled geogrid 910 indicates tilt on the IMUs 918, and significant strain on the strain gauge 916, which would send signals that the IoT platform would interpret and generate a reading as to the degree of deformation and calculate a potential failure rate. The tilt of the IMU would indicate an area where the deformation has occurred and further signal changes in the subgrade. The IMU's may be placed on both the top and bottom of the sensor enabled geogrid, similarly, the flex sensor or strain gauge may also be accompanied along a member (rib) of a geogrid or geofabrics and be placed on either the top or bottom portion.

Figure 10:
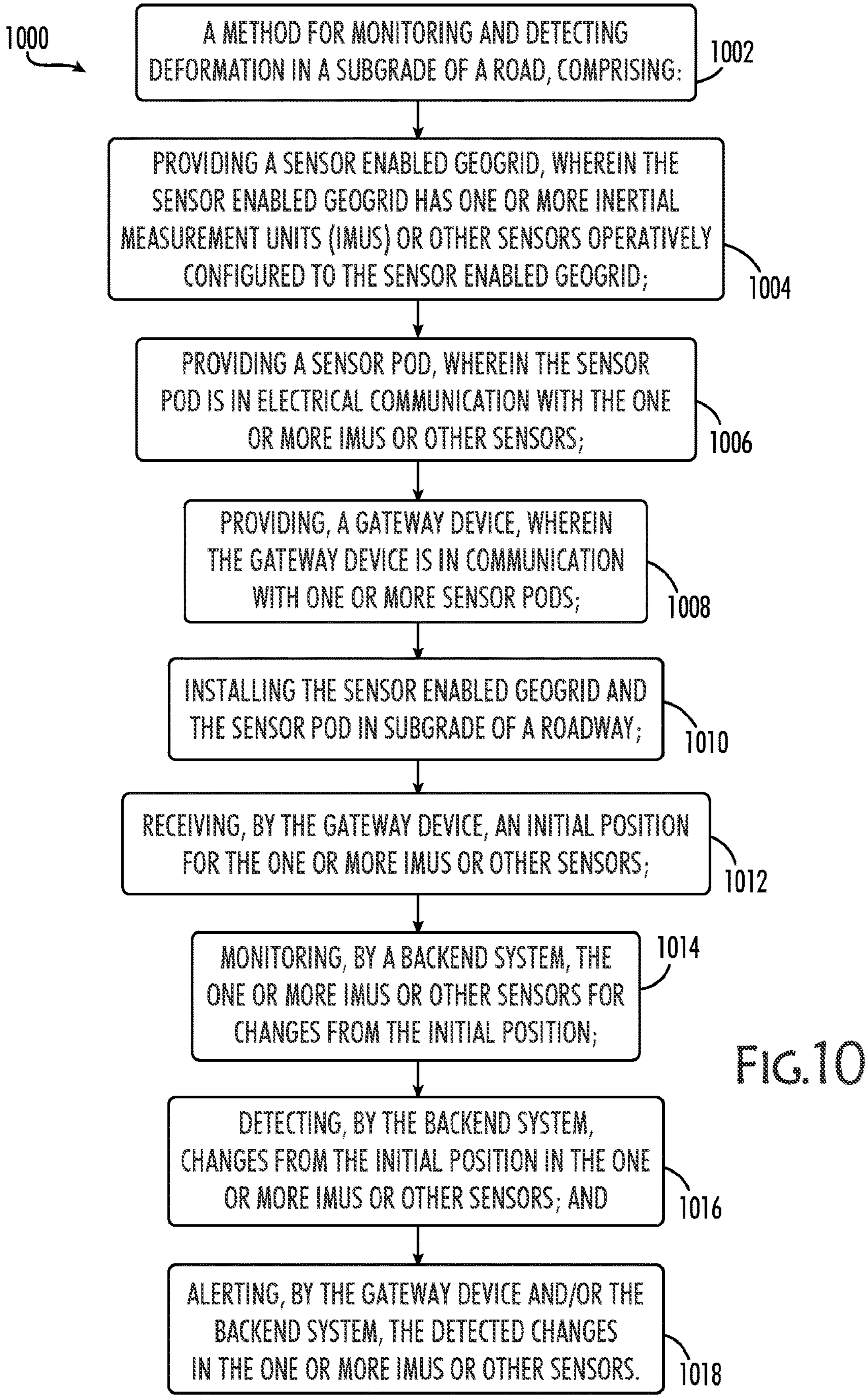
FIG. 10 illustrates an example flow diagram of a method herein.

Referring now to FIG. 10, an example of a flow diagram of a method for monitoring and detecting deformation in a subgrade 1002, in this case for a road, in other example it may be any infrastructure in which structural health and monitoring of subsurface conditions is needed. The method begins by providing a sensor enabled geogrid, wherein the sensor enabled geogrid has one more IMUs, as well as other sensor such as a flex sensor, a strain gauge, a moisture sensor, an ambient light sensor, and a temperature sensor 1004. Next, providing a sensor pod, wherein the sensor pod is in electrical communication with the sensors 1006. Next, providing a gateway device, wherein the gateway device is in electrical communication with the sensor pod. Next, installing the sensor enabled geogrid and the sensor pod in a subgrade 1010. Then, receiving, by the gateway device an initial position of the IMUs and initial readings of the other sensors 1012. Next, monitoring, by a backend system through an IoT platform, the sensors for change from the baseline, and performing various algorithms to predict change over time 1014. Then detecting a change in position or tilt of the IMUs that would indicate deformation of a subgrade 1016, and alerting by the system the detected changes and severity of the deformation 1018.

Figure 11:
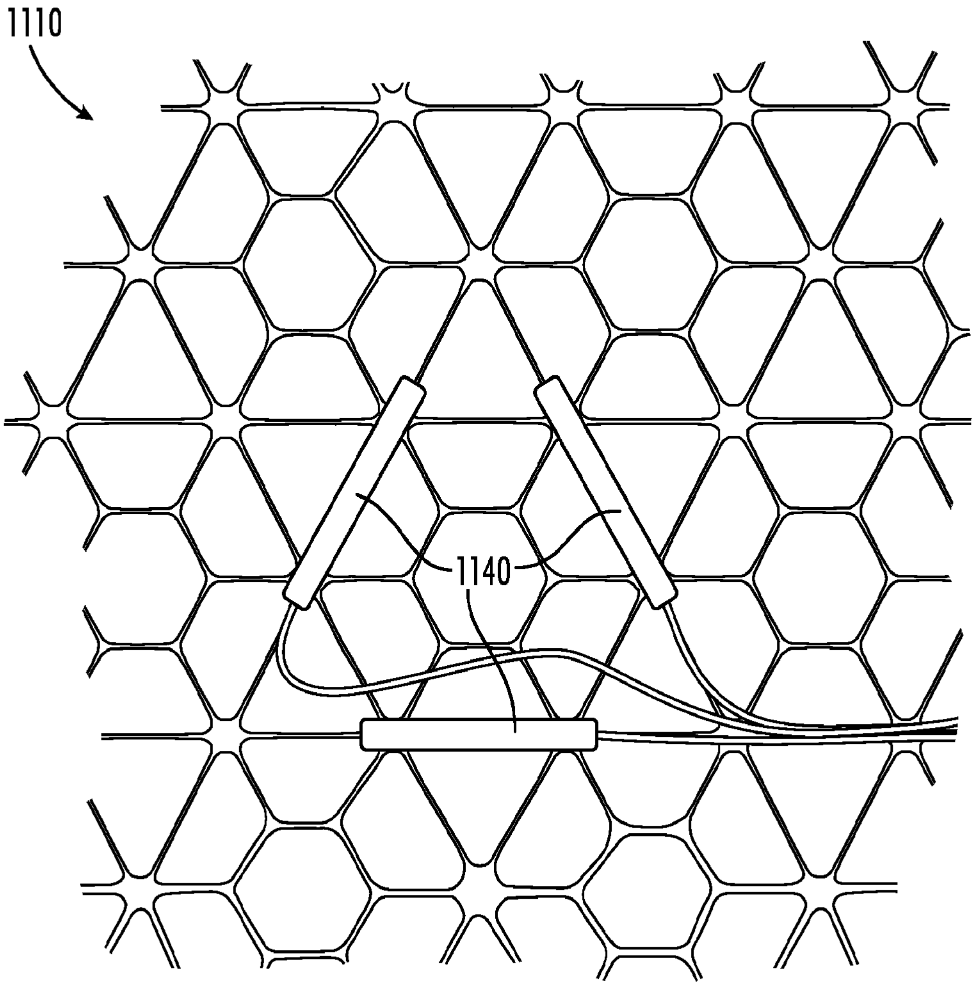
FIG. 11 illustrates an example sensor enabled geogrid wherein the strong axis members are configured with strain gauges or flex sensors.

Referring now to FIG. 11 with a spatial configuration of strain gauges and/or flex sensors 1140 along the strong axis ribs or members of a sensor enabled geogrid 1110. Placing the strain gauges or flex sensors within this orientation allows for detection of flex or strain across a strong axis which covers a larger area and enables member forming or elongated sensing due to the rigidity of the strong axis and the sensitivity of detecting strain. In the example strain may occur, i.e. deformation, at lengths of meters away from the sensors and still reflect on recordings. Thus, a configuration as disclosed in FIG. 11 may be optimal to cover vast areas for detection, such as roadways, marine applications, rail applications, and more.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

Therefore, the following is claimed:

1. A system for monitoring and detecting deformation in a subgrade of infrastructure, comprising:
- a sensor enabled geogrid installed in the subgrade, comprising:
  - a geogrid; and
  - sensors operatively configured to the geogrid, wherein the sensors are configured to detect change from an initial position, the sensors comprising at least one inertial measurement units ("IMUs") and at least one strain gauge;
- a sensor pod, wherein the sensor pod is placed in the subgrade and is in electrical communication to the sensor enabled geogrid;
- a gateway device, wherein the gateway device is in electrical communication to the sensor pod;
- a backend system, comprising:
  - a computing device;
  - a display; and
  - a software program for interpreting information from the sensors that is configured to non-transitory memory of the computing device to determine an event has occurred, wherein an event is a change in the subgrade detected by the at least one IMUs registering a change from its starting position as well as a resistance change on the at least one strain gauge.

2. The system of claim 1, wherein the IMU is comprises an accelerometer and a gyroscope.

3. The system of claim 1, wherein the sensors operatively configured to the geogrid further comprises is a flex sensor configured to a member of the geogrid so that flex is detected from forces on the sensor enabled geogrid.

4. The system of claim 1, wherein the gateway device is in electrical communication to a plurality of sensor pods, and wherein the gateway device sends and receives the information from the plurality of sensor pods.

5. The system of claim 1, further comprising a mobile computing device, wherein the mobile computing device is configured to access the backend system and can view a user interface to the software program.

6. The system of claim 1, wherein the at least one IMU and the at least one strain gauge is used to detect a failure of any of the IMUs and strain gauges.

7. A method for monitoring and detecting deformation in a subgrade, comprising:
- providing a sensor enabled geogrid, wherein the sensor enabled geogrid has one or more IMUs and one or more strain gauges operatively configured to the sensor enabled geogrid that are capable of determining tilt;
- providing a sensor pod, wherein the sensor pod is in electrical communication with the one or more IMUs and the one or more strain gauges;
- providing, a gateway device, wherein the gateway device is in communication with the sensor pod;
- installing the sensor enabled geogrid and the sensor pod in a subgrade of infrastructure;
- receiving, by the sensor pod an initial position for the one or more IMUs and the initial resistance measurement of the one or more strain gauges;
- monitoring, by a backend computing system, the one or more IMUs, for variance from the initial position, and the one or more strain gauges for change in resistance;

detecting, by the backend computing system, variance from the initial position in the one or more IMUs and a change in resistance from the one or more strain gauges; and alerting, by the backend computing system, the detected variance in the one or more IMUs and the change in resistance from the one or more strain gauges.

8. The method of claim 7, wherein detecting the variance from the initial position in the one or more IMUs, detects deformation within the subgrade of the infrastructure due to a change in axis tilt of the one or more IMUs.

9. The method of claim 7, further comprising, providing a sensor enabled geogrid configured with at least one of the following sensors: a flex sensor, a moisture sensor, a temperature sensor.

10. The method of claim 9, further comprising, receiving, by the gateway device, signals from at least one of the following sensors: a flex sensor, a strain gauge, a moisture sensor, or a temperature sensor.

11. The method of claim 7, further comprising providing remedial repair at a location where the variance was detected by the one or more IMUs in the subgrade.

12. The method of claim 7, wherein alerting transmits a visual or audible signal to traffic on a roadway of potential failure.

13. The method of claim 7, wherein alerting transmits a message or communication to a roadway maintenance unit regarding the detected variance by the one or more IMUs in the subgrade.

14. The method of claim 7, further comprising transmitting, by the sensor pod, across a network, the initial position of the one or more IMUs, and the initial resistance of the one or more strain gauges.

15. The method of claim 7, wherein providing the sensor enabled geogrid further provides one or more sensors on a top and a bottom portion of the sensor enabled geogrid.

16. The method of claim 7, wherein providing the sensor enabled geogrid, further provides a flex sensor operatively configured to an elongated member of the sensor enabled geogrid.

17. The method of claim 7, further comprising executing an infrastructure processing engine on the backend computing systems, wherein the infrastructure processing engine processes an algorithm to calculate a degree of tilt of the one or more IMUs.

18. The method of claim 7, wherein the one or more IMUs and the one or more strain gauges is used to detect a failure of any of the one or more IMUs and strain gauges.

* * * * *